April 13, 1926.
C. E. WEATHERWAX
1,580,356
HEADLIGHT FOR AUTOMOBILES
Filed June 20, 1925
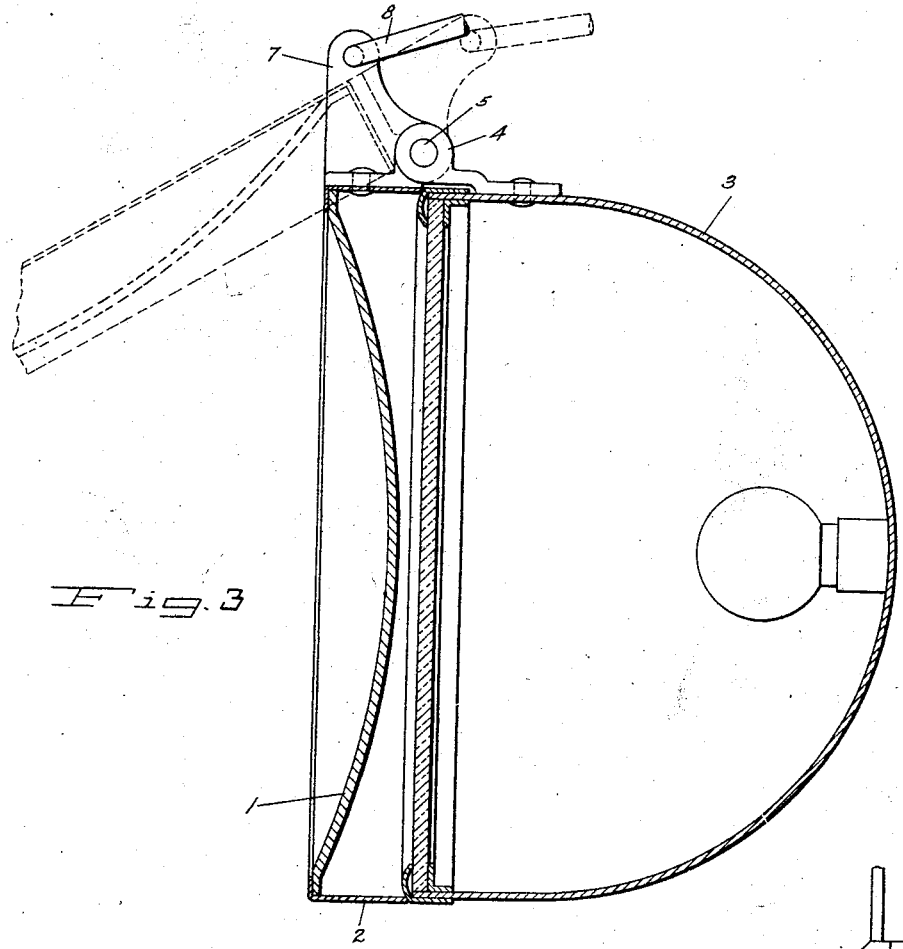
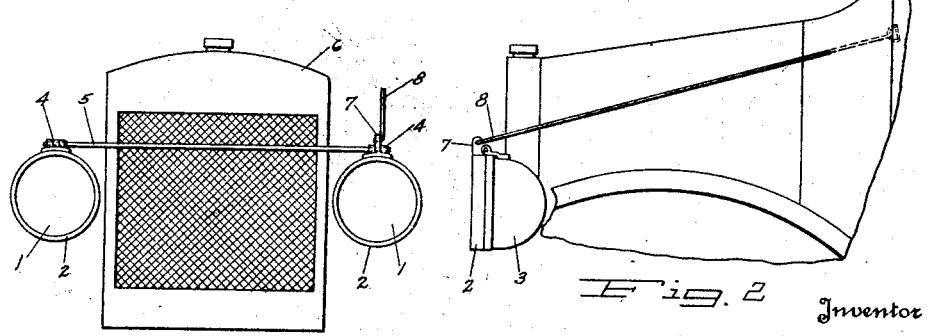
Inventor
C. E. Weatherwax.
By Goldberg
Attorney Patented Apr. 13, 1926.

1,580,356

UNITED STATES PATENT OFFICE.

CLAUDE E. WEATHERWAX, OF PORTLAND, OREGON.

HEADLIGHT FOR AUTOMOBILES.

Application filed June 20, 1925. Serial No. 38,402.

*To all whom it may concern:*

Be it known that I, CLAUDE E. WEATHERWAX, a citizen of the United States, residing at Portland, in the county of Multnomah, and State of Oregon, have invented a new and useful Headlight for Automobiles, of which the following is a specification.

My invention relates to headlights for automobiles, in which a convex mirror is swingingly attached in front of the customary headlights.

The objects of my invention are to produce a device which will eliminate the blinding glare of headlights and at the same time illuminate the road in front of the driver as well as the front part of the automobile so that a driver approaching from the opposite direction will see clearly the outlines of the approaching machine.

Another object is to have the convex mirror so arranged that the rays from the head lights will be largely unobstructed if clear vision in the distance is desired. In day time the convex mirror closes over the head light and presents a far neater appearance than visors which protrude permanently from the head light.

Other objects and advantages are to be found in the construction and arrangement of parts, as will be described in the specification, and particularly pointed out in the appended claim.

I attain these objects with the mechanism illustrated in the accompanying drawing, in which—

Fig. 1 is a front view of my invention as attached to the head lights at the side of the radiator.

Fig. 2 is a side view of part of an automobile with my convex mirror attached to the head light, and with the link reaching to the driver's seat.

Fig. 3 is a vertical longitudinal section through the head light and convex mirror.

Similar numerals refer to similar parts throughout the several views.

The convex mirror 1 is to enclose in a ring 2 which is attached to the head light 3 by means of the hinge 4. The hinge rod 5 extends across the front of the radiator 6 and connects with the convex mirror 1 on the other side of the automobile radiator 6. At least one of said convex mirrors should be provided with an upwardly projecting lug 7, to the end of which is attached a link 8 which reaches back to the driver's seat and is adapted to be held in adjusted position preferably on the instrument board of the automobile.

In driving on a little frequented road the convex mirror can be swung upward into a nearly horizontal position, in which case all the light rays of the head light will be thrown far ahead. If the driver should encounter another automobile, the convex mirror can be lowered to the position indicated by the dotted lines in Fig. 3 where the glare will be entirely eliminated but a very strong light will be reflected toward the road and thrown back to illuminate the entire front of the automobile thus giving the approaching driver a very clear idea of the clearance necessary for safe passage.

When driving during daytime the convex mirror is lowered to cover the entire front of the head light and has a very neat appearance.

Having thus described my invention, it will be seen that my objects have been accomplished and, though I have shown the preferred form of construction, I reserve to myself the right to make minor changes, providing I do not contravene the spirit and principle of my invention.

I claim:

In a device of the character described, an automobile, a head light having lens, a ring encircling the lens of the head light, a hinge connecting the ring and the head light at the top of said head light, a convex mirror inclosed in said ring, said mirror being reflecting on the convex side, and turning the deflecting side toward the head light, a lug extending upwardly from the hinge on the ring, and means to swing the convex mirror up and down in front of the head light, whereby the upper part of the rays of the head light are reflected to a diffused light illuminating the road in front of the automobile and also the front part of the automobile itself.

Signed by me at Portland, Oregon, this 15th day of June, 1925.

CLAUDE E. WEATHERWAX.